April 21, 1942.         T. H. THOMPSON         2,280,201
SPRING LINER
Filed April 7, 1941
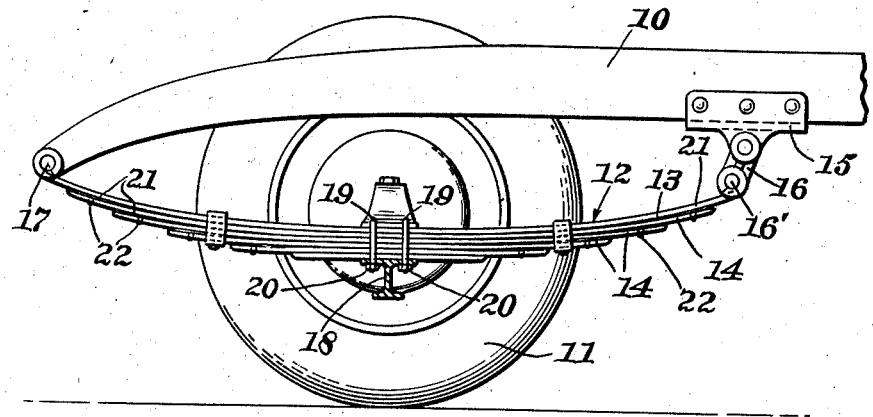
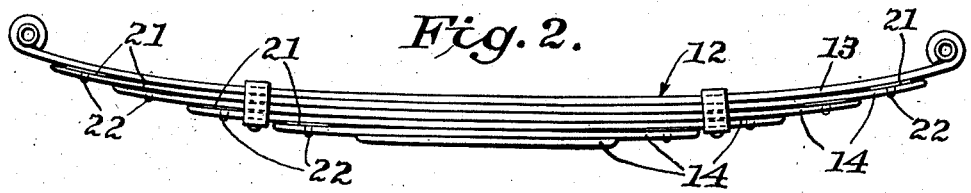
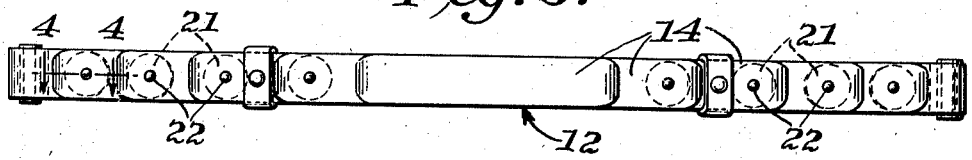
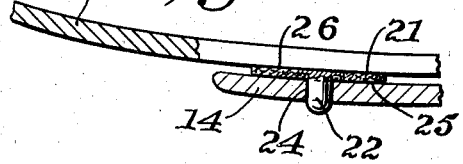
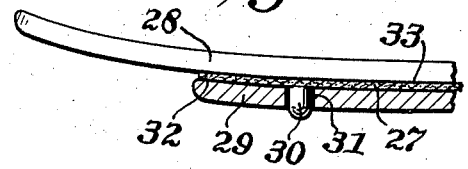
Inventor:
Tom H. Thompson,
By Cushman Darby & Cushman
Attorneys.

Patented Apr. 21, 1942

2,280,201

UNITED STATES PATENT OFFICE 2,280,201

SPRING LINER

Tom H. Thompson, Detroit, Mich.

Application April 7, 1941, Serial No. 387,289

4 Claims. (Cl. 267—47)

The present invention relates to supporting springs for vehicles, and more particularly to an improved liner or insert arranged to be positioned between adjacent leaves of the spring for the purpose of insuring smooth, uniform and efficient operation of the spring structure.

The invention is directed to spring liners of the class shown and described in my prior United States Patents Nos. 2,105,869, 2,107,455, 2,161,838 and 2,175,230, and provides specific improvements in liners adapted to function upon the principles explained in detail therein.

Heretofore, liners or inserts for laminated leaf springs have been provided with fastening or holding means such as pins, projections and the like, arranged to extend into complementary openings in an adjacent leaf spring in order to maintain the liner in relatively fixed position with respect to one leaf spring upon relative movement of the other adjacent leaf of the spring. In other words, it is desired to maintain the liner in fixed position with respect to one adjacent leaf (hereinafter called the relatively stationary leaf) and to provide for relative movement between the liner and the other adjacent leaf. Since in springs of this type the frictional engagement of the movable surface of the liner may become greater than the frictional engagement of the surface normally at rest, it sometimes happens that, unless positive means are provided for holding or maintaining the insert in a fixed position relative to the stationary leaf spring, the pin on the liner may be sheared off or broken, due to movement of the liner with the displaceable spring leaf.

Accordingly, an essential feature of the present invention consists in associating with a laminated supporting spring, a liner or insert, the opposite faces or sides of which have contacting surfaces of different frictional characteristics. In other words, the surface of the liner on the same side as the retaining means and in contact with the relatively stationary leaf spring, is preferably provided with a coating of suitable organic material having a high coefficient of friction such as asphalt, synthetic resin, beeswax or the like, adapted to positively resist relative movement between the liner and that leaf spring, while the opposite surface of the liner adjacent and in contact with the relatively movable spring leaf has a lower coefficient of friction or, in some cases, an anti-frictional surface to permit controlled movement of the latter leaf spring relative to the liner, without displacing the liner or shearing the fastening means thereon.

A further object consists in combining with the mechanical retaining means formed by the pin or projection of the liner, friction producing means on one side or face of the liner and a friction reducing surface on the opposite side of the liner, so as to insure longitudinal displacement of the movable leaves of the spring relative to the liners and the stationary leaves, without disturbing the retaining means or pins on the liners.

Other objects and advantages of the invention will become apparent from the following description when taken in conjunction with the accompanying claims and drawing.

Referring to the drawing, in which is shown preferred embodiments of the invention:

Figure 1 is a fragmentary side elevation of a vehicle frame provided with a laminated leaf spring having my invention associated therewith;

Figure 2 is a detailed side elevation of the laminated spring shown in Figure 1;

Figure 3 is a bottom plan view of the spring of Figure 2;

Figure 4 is an enlarged sectional detailed view taken substantially along the line 4—4 of Figure 2;

Figure 5 is a detailed sectional view of the liner or insert;

Figure 6 is a detailed plan view of a full length liner or insert; and

Figure 7 is a side view with parts in section, showing a full length insert positioned between adjacent leaves of the spring.

Referring to the drawing, in which like numerals indicate like parts in the several views, 10 designates a portion of the chassis frame of a vehicle, and 11 one of the rear wheels thereof. A laminated supporting spring 12 composed of a main spring leaf 13, and a series of underlying spring leaves 14 of varying or graduated lengths, may be connected by the shackle 16 to one end of the spring 12, as at 16', while the opposite end of the spring is pivotally connected to the frame as at 17. The multiple spring 12 between its ends is secured to the rear axle 18 in any suitable manner, such as by the threaded U-shaped bolts 19 and the nuts 20 (Figure 1).

The adjacent leaves of the spring 12 are maintained in spaced relation from each other by the liners or insert 21, which may be of any suitable tough fibrous material, such as low grade paper board stock. Each of the liners 21 has projecting outwardly or downwardly therefrom a pin or protuberance 22 suitably secured or embedded in the liner, as at 23 (Figure 5) and arranged to extend into a complementary opening or depression 24 formed in the adjacent end portion of the leaves 14. The pins 22 constitute mechanical means for securing the inserts 21 to the relatively stationary leaves and for preventing the movement of the inserts with the displaceable or movable leaves.

As particularly shown in Figure 4, the liner or insert 21 is positioned between the movable main spring leaf 13 and its adjacent relatively fixed or stationary leaf spring 14 so as to maintain these leaves in proper spaced relation to each other. The liner also constitutes a bearing surface or member over which the leaf 13 is slidably and independently movable. As each insert 21 is connected through the pin 22 to one of the relatively stationary leaves, it will be seen that unless the insert is maintained in a stationary position relative to the spring leaf 13 when the latter is displaced, any longitudinal movement imparted to the liner relative to its adjacent fixed leaf 14 would cause shearing or breaking off of the pin 22. By providing the opposite sides or faces of the inserts 21 with contacting surfaces having relatively different frictional characteristics, movement of the relatively movable leaf spring of each pair of adjacent springs, may be effected without danger of shearing or damaging the fastening means or pins 22. Accordingly, the face of each of the inserts 21 on the same side as the pin 22 and adjacent the relatively fixed leaf 14, is preferably provided with a stratum or coating of any suitable organic material 25, which has a high coefficient of friction, such as asphalt, synthetic resin or beeswax. The opposite side or face contiguous to the movable leaf may be smooth so as to have a desired coefficient of friction, lower than the first mentioned side, or may be provided with a covering 26 of anti-frictional material, such as wax paper or the like, to permit a movement of the leaf 13 thereover, as explained in the above identified patents, without danger of causing movement of the liner 21 relative to its adjacent stationary leaf 14.

Thus, it will be seen that by providing one side of each of the liners 21 with a friction producing material and the opposite side with a friction reducing surface, the movable leaf or leaves may be displaced longitudinally relative to both their associated liners and their adjacent stationary leaves, without disturbing the fixed position of the retaining means or pins 22 which connect the liners with the relatively stationary leaves. In other words, the mechanical fastening or retaining means provided by the pins 22 on the inserts 21 have each coacting therewith, the frictional surface 25, which has a higher coefficient of friction than the opposite side 26 of the liner, in order to insure the liner being maintained with its adjacent stationary leaf in a relatively fixed position when its adjacent movable leaf is displaced during the travel of the vehicle.

Instead of providing partial or spaced inserts positioned adjacent the ends of the multiple leaf springs, a full length liner such as 27 (Figure 6) may be provided. The liner 27 is substantially coextensive in overall dimensions to the shorter of the adjacent pair of leaf springs with which it is associated, and is interposed betwen a movable or main leaf spring 28 and a relatively stationary or fixed leaf 29 by a suitable fastening means, such as the pins 30 which project outwardly therefrom so as to extend into openings 31 in the leaf 29 in substantially the same manner as the insert 21 previously described. The face of the insert 27 from which the pins 30 project, is preferably coated or has applied thereto a friction producing material 32, such as asphalt, tar or the like, while the opposite face 33 of the liner is preferably smooth or has a friction reducing material applied thereto, so as to offer only the desired amount of resistance to the longitudinal movement of the leaf 28, as explained in the aforesaid patents. Thus, simple and efficient means are provided for precluding the possibility of the pins 30 being sheared or damaged, due to displacement of the liner with the movable leaf spring 28.

A further advantage of the use of the pins 22 in combination with the frictional coating for preventing displacement of the inserts, is that the pins constitute a means for accurately positioning the inserts in exactly the correct relation to the spring leaves during original assembly of the springs, or during replacement or repair thereof. Hence there is no danger that the inserts will be initially incorrectly positioned and retained in such incorrect position by the frictional securing means.

It is to be understood that the several forms of the invention shown and described are merely illustrative of preferred embodiments and that such changes may be made as fall within the purview of one skilled in the art without departing from the spirit of the invention and the scope of the appended claims.

I claim:

1. A spring of the class described including superimposed leaves, said leaves adjacent their ends having openings therein, a liner between each adjacent pair of leaves, said liner having retaining means projecting into one of the openings, one of each pair of adjacent leaves when the spring is displaced being movable relative to its adjacent leaf, each liner on the same side as the retaining means, having a coating of friction producing material and on its opposite side having a friction reducing surface so as to prevent shearing of the retaining means when the spring is displaced.

2. A spring of the class described including superimposed leaves, an insert between adjacent leaves having a projection extending into a complementary opening in the adjacent leaf, said insert on the same side as the projection having a coating of asphalt and on the opposite side a friction reducing surface to prevent shearing of the projection when the adjacent leaves are displaced longitudinally relative to each other.

3. A liner adapted to be inserted between adjacent leaves of a laminated spring, said liner having a pin projecting outwardly from one side thereof, the surface of the liner on the same side as the pin having a coating of friction producing material and the opposite surface of the liner being provided with a friction reducing surface.

4. A liner adapted to be inserted between adjacent leaves of a laminated spring, said liner having a pin extending outwardly from one side thereof, the side of the liner adjacent the pin having a coating of asphalt and the opposite side having a friction reducing surface.

TOM H. THOMPSON.